Figure 5:
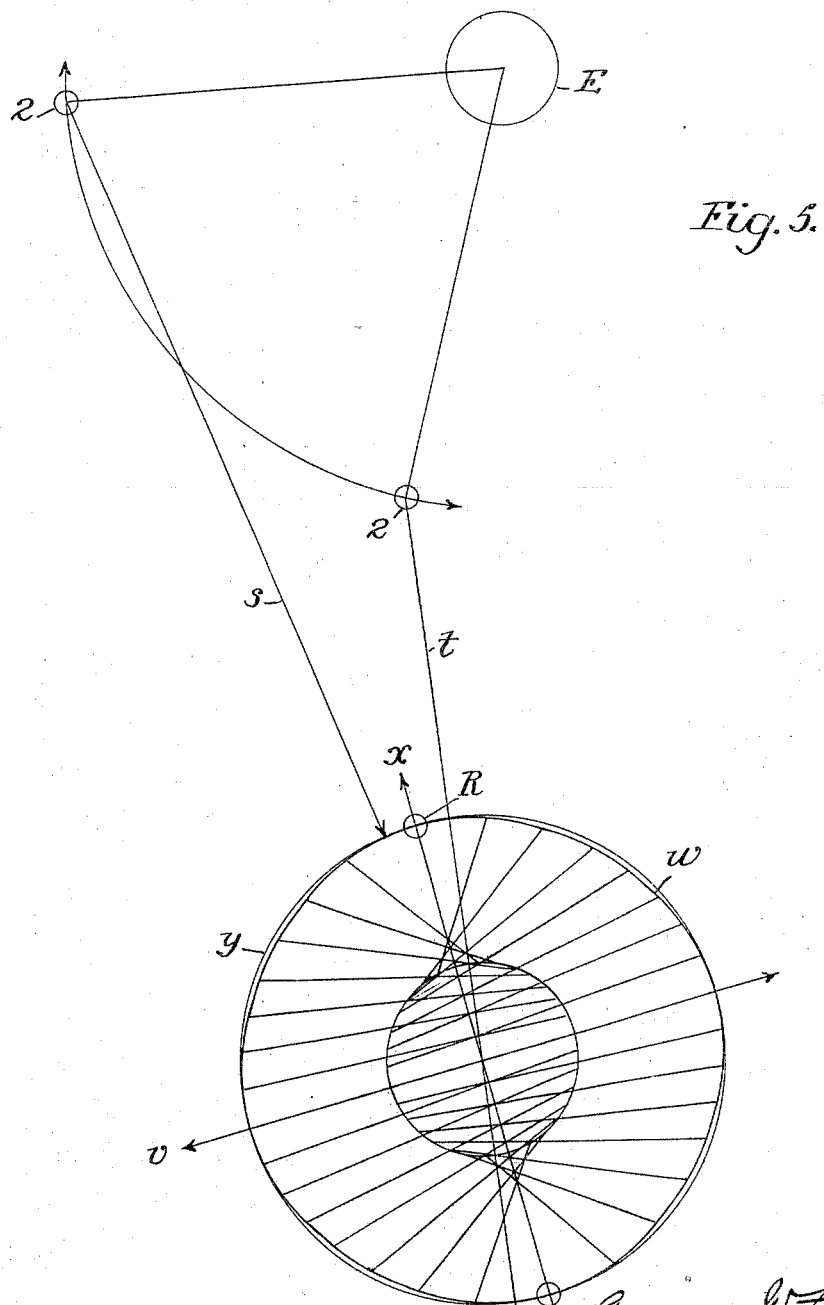

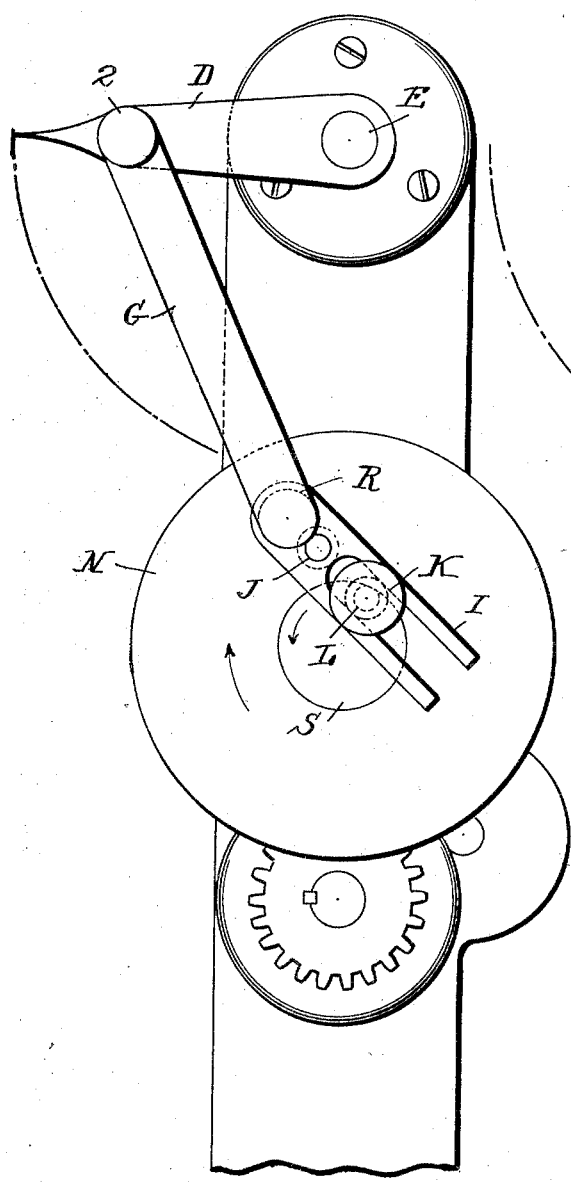
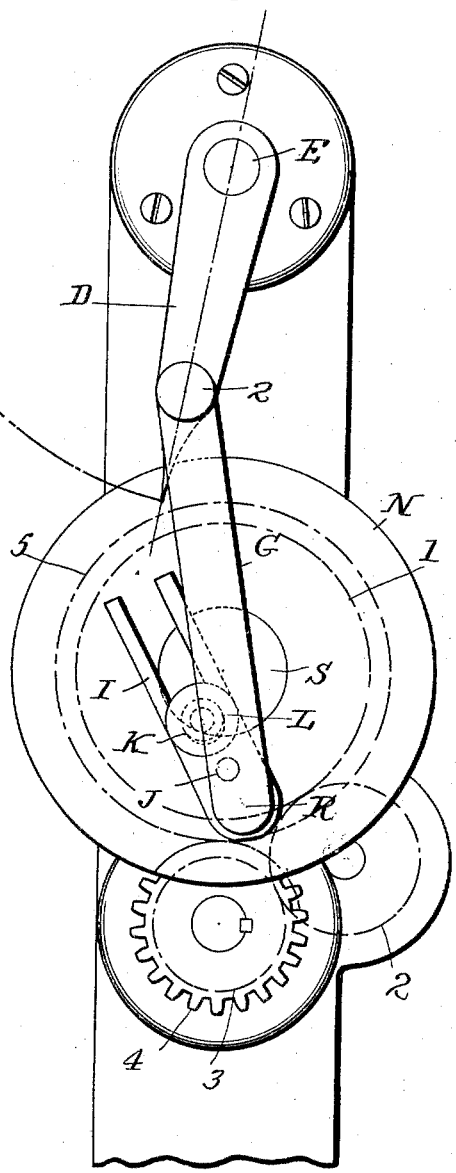

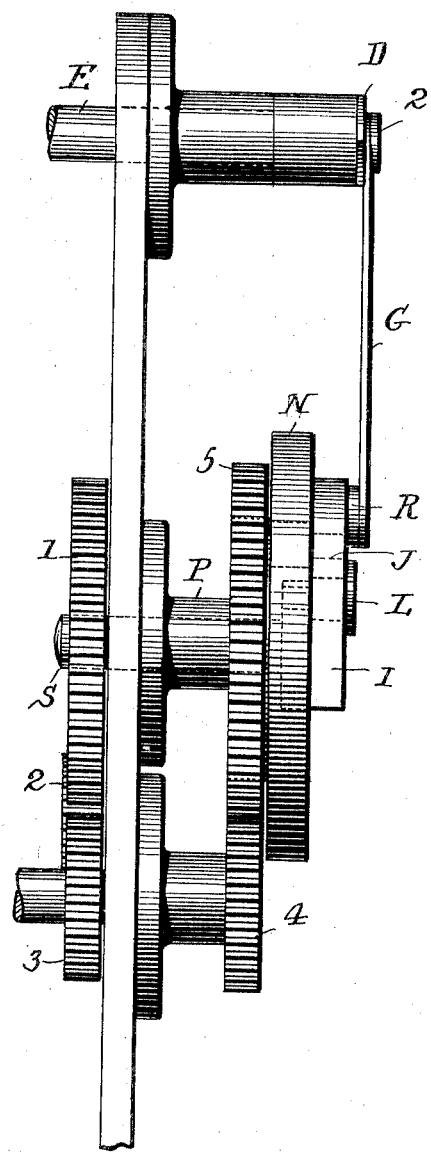
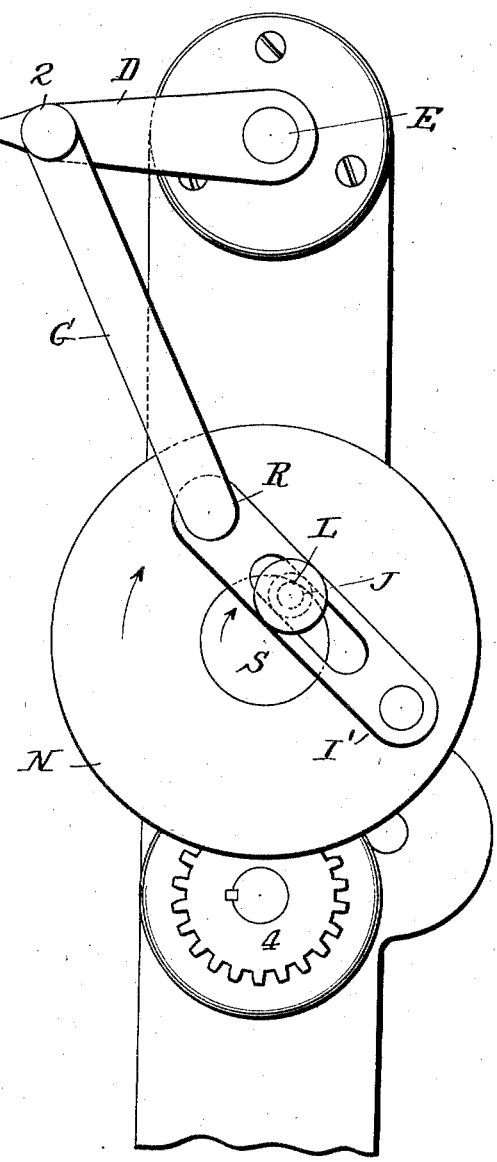

No. 766,878. Patented August 9, 1904.

UNITED STATES PATENT OFFICE.

GEORGE W. FOSTER, OF WESTFIELD, MASSACHUSETTS.

MECHANICAL MOVEMENT.

SPECIFICATION forming part of Letters Patent No. 766,878, dated August 9, 1904.

Application filed July 21, 1903. Serial No. 166,459. (No model.)

*To all whom it may concern:*

Be it known that I, GEORGE W. FOSTER, a citizen of the United States, residing at Westfield, in the county of Hampden and State of Massachusetts, have invented certain new and useful Improvements in Mechanical Movements, of which the following is a specification.

My invention consists of a certain combination of parts constituting a new mechanical movement.

In the accompanying drawings, Figure 1 is a front view of the parts constituting my new mechanical movement as arranged to operate a rock-shaft; Fig. 2, the same showing the parts in a different position. Fig. 3 is a side view. Fig. 4 is a view illustrating a modification. Fig. 5 is a diagram in which are plotted the different positions of the parts during a revolution.

In many cases, as in reciprocating the yarn-guides of winding-machines, it is desirable to impart a reciprocating movement to certain parts of mechanism, so that such parts instead of moving with a decreased speed prior to reversal travel at approximately the same speed throughout and are reversed without any substantial dwell at the reversing-points. To secure this result, I connect the part to be moved with a wrist-pin carried in revolution round a shaft and I vary the travel and course of said pin during parts of each revolution. This may be done in different ways. As shown in Figs. 1, 2, and 3, the pin R is carried by a lever I, supported on a fly-wheel or support N, turning about the axis of a concentric shaft S, which rotates in a hollow stud P. The pin R is connected by a pin 2 to an arm D on a rock-shaft E by a connecting-rod G. The lever I is pivoted by a pin J, eccentric to the axis of the shaft S. The crank-lever I is not only carried with the supporting-wheel N around the axis of the shaft S, but it has at the same time a vibratory motion on the pin J. This vibration may be imparted in different ways, but, as shown in Figs. 1 to 3, is effected by the revolution of a pin L, carried eccentrically at the end of the shaft S, said pin L extending into a longitudinal slot in the lever I and preferably carrying an anti-friction-stud K. (Shown in dotted lines.) The shaft S and wheel N are to be driven by gears 1 2 3 4 5 or otherwise in opposite directions, and as the pin J revolves in a circle round the axis of the shaft S the end of the lever I and its wrist-pin R, which connects the rod G thereto, are not only carried by the rotation of the shaft S, but during parts of each revolution there is an added motion in the same direction, resulting from the swinging of the lever I on its pin J as the rotation of the shaft S carries the pin L in a circle in a direction opposite to that of the rotation of the wheel N. The pin R, therefore, in moving from left to right above the shaft S not only has the movement of the wheel N, but is carried forward faster than if connected to said wheel, as the upper end of the lever I is carried to the right by the movement of the pin L in the opposite direction. As a consequence, the pin R during a given interval has a greater movement than it would have if it were fixed on the wheel N, and the shaft E has during said interval a greater or more extended and more rapid rocking movement than it would have if driven from a crank-pin secured to the wheel N, as usual—that is, there is not the usual dwell at this point. The pin R is carried round the axes of the shafts, but not in a true circle $y$, as shown in Fig. 5, for although when the center of the pin R passes the lines $x$ and $v$, extending at right angles through the center of the shaft, it travels substantially in a circle concentric with the latter center. On passing to or from each of said lines it swings in a path around the center of the pin J, and thus is carried also radially onward or inward, imparting a quicker movement to the connecting-rod than would otherwise be the case, the travel of the pin R being shown by the line $w$, Fig. 5. This action results at the four points of the revolution. The shaft E is therefore rocked at a speed which instead of gradually increasing and then gradually decreasing as it rocks in in either direction is approximately uniform throughout, and the changes in speed while effected positively are free from shocks and jars, because the part moved is reversed in its direction of movement before the wrist-pin passes the line *s* or *t* drawn through the axis of the shaft and the connecting-pin 2. It will be seen by the arrangement described there is practically no "dead-center"—that is, the centers of the shaft. The pins R and J and 2 are never in line nor is the wrist-pin ever in line with the center of the shaft and the connecting-pin 2 when the pin 2 is at the limit of its movements.

It will be evident that the timing of the movements may be varied by the timing of the relative rotary movements of the shaft S and part N and varying the positions or distances of the pivot-points, which may be effected in any desired or required manner.

While I have described the pin J as carried by a wheel, which also constitutes a fly-wheel, it will be evident that it may be carried by any suitable arm or support, and it also will be evident that the described movement may be varied by varying the relative rotations of the two parts N and S and that these may rotate in the same direction, but at different speeds, if a lever *i'* is pivoted at the opposite side of the axis, as indicated in Fig. 4.

Without limiting myself to the construction and arrangement of parts shown, I claim—

1. The combination with a part to be reciprocated, of a connecting-rod, a wrist-pin attached thereto, a shaft about the axis of which the pin is revolved, and means for imparting a continuous forward but gradually-increased and then gradually-decreased speed of movement to said pin and for moving it radially during parts of each revolution of the pin around the axis of the shaft, substantially as set forth.

2. The combination with a part to which a reciprocating motion is to be imparted, of a shaft, a wrist-pin carried continuously forward in revolution thereby and connected with said part, and means for increasing and then decreasing the speed of travel of the pin in its path at intervals and for moving it radially at different points during its revolution, substantially as set forth.

3. The combination with a part to which a reciprocating motion is to be imparted, of a shaft, a wrist-pin carried with a continuous forward movement in revolution thereby and connected with said part, and means for increasing and then decreasing the speed of travel of the pin in its path at intervals and also carrying it radially outward and inward during its revolution, substantially as set forth.

4. The combination of a shaft, a part to be reciprocated, a lever I eccentrically pivoted to the shaft, a wrist-pin carried by the lever, and means for vibrating said lever in a path concentric with its fulcrum during the continuous forward movement of the wrist-pin, substantially as set forth.

5. The combination of a shaft, a support, and means for rotating it about the axis of the shaft, a lever pivoted to the support, a fulcrum-pin carried by the lever, a connecting-rod pivoted to said pin, and a part to be moved, to which said rod is connected, substantially as set forth.

6. The combination of a shaft, a support and means for rotating it about the shaft, a lever pivoted to said support, a pin carried by the lever, a connecting-rod pivoted thereto, and a pin carried eccentrically by the shaft and engaging said lever to vibrate the same, substantially as set forth.

7. The combination of a shaft, a support, a lever pivoted to said support, a pin carried eccentrically by the shaft and engaging said lever to vibrate the same, and means for driving the shaft and support independently, substantially as set forth.

8. The combination of a shaft, a support, a lever pivoted to said support, a pin carried eccentrically by the shaft and engaging said lever to vibrate the same, and means for driving the shaft and support independently in opposite directions, substantially as set forth.

9. The combination of the shaft, a support, and slotted lever pivoted to the support, a wrist-pin carried by said lever, a rod connected to the wrist-pin, and a pin carried eccentrically by the shaft and entering the slot of the lever, substantially as set forth.

In testimony whereof I have signed my name to this specification in the presence of two subscribing witnesses.

GEO. W. FOSTER.

Witnesses:
  FRED A. WILDE,
  JOHN E. CANNING.